April 17, 1934.  E. S. SAVAGE  1,955,026
ELECTRIC COOKER
Filed Oct. 5, 1931
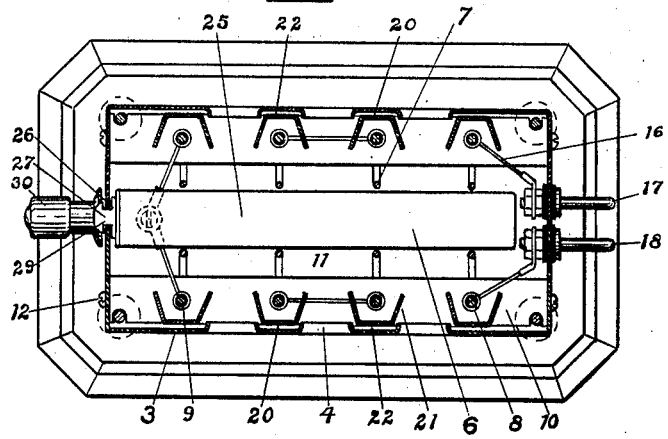
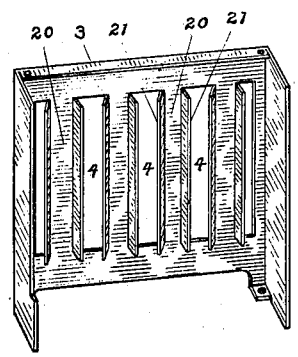
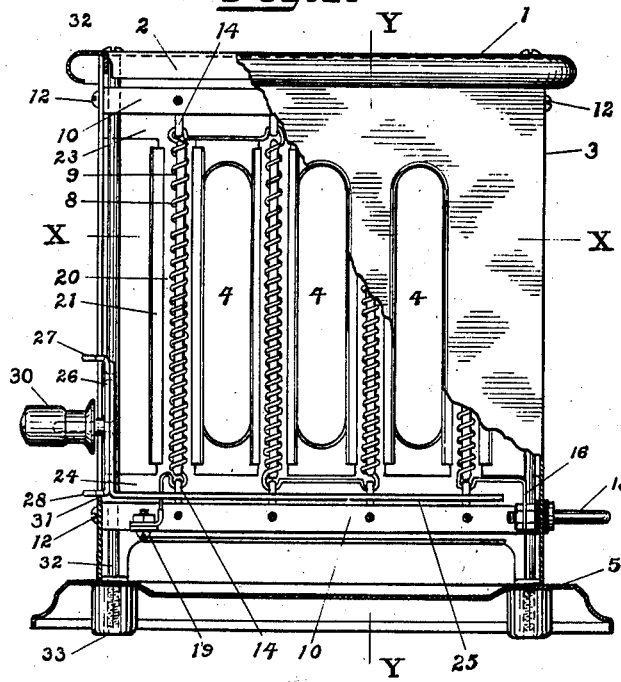
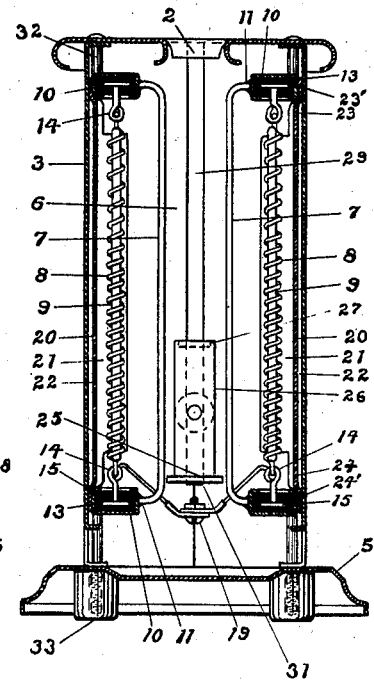
INVENTOR
Edward S. Savage Patented Apr. 17, 1934

1,955,026

UNITED STATES PATENT OFFICE 1,955,026

ELECTRIC COOKER

Edward S. Savage, Rochester, N. Y.

Application October 5, 1931, Serial No. 566,924

3 Claims. (Cl. 219—19)

This invention relates to electric toasters or cookers and is particularly advantageous when applied to the oven type wherein the bread to be toasted or the material to be cooked is heated upon two opposite sides simultaneously, having two sets of electric heating elements positioned on each side thereof.

While this invention is applicable to toasters and cookers for various purposes the following description will specifically describe the invention in an illustrative sense as applied to a bread toaster only.

One primary object of the invention is to provide a device of the above mentioned type in which the slice of bread is visible while being toasted so that it may be removed when the desired degree of toasting has been effected.

Another object of the invention is to provide a device of this kind in which visibility is obtained without loss of efficiency and without the use of a breakable glass window.

Another object of the invention is to provide a visible electric toaster in which a large portion of the bread surface is visible while being toasted and at the same time the heating elements are invisible, thereby eliminating glare which would be disagreeable and would also interfere with visibility and the accurate determination of the proper time to remove the toast.

Still other objects of the invention are, to provide a simple means for supporting and removing the slice of bread and to provide a simple and cheap construction, easy to assemble and easy to take apart for renewing the heating elements.

In the past other electric toasters in which visibility was a primary object have been produced but apparently each has possessed some one or more objectionable feature, such as inefficiency, small area of visibility, use of glass windows subject to breakage and difficult to keep clean, or heating elements in view causing glare and interfering with visibility. The present invention possesses none of these objectionable features and also possesses several structural advantages new to this type of device.

For a more complete understanding of my invention reference should be had to the accompanying drawing, in which, Fig. 1 is a sectional plan view of the improved electric toaster, the section being taken on the line XX of Fig. 2;

Fig. 2 is a front view partly broken away;

Fig. 3 is a sectional view taken on the line YY of Fig. 2;

Fig. 4 is a perspective view on a smaller scale of a modified structure of one half of the casing shell.

The toaster illustrated in the drawing comprises, externally, a cover plate 1 with a centrally located longitudinal slot or opening 2 through which the bread to be toasted is inserted, a casing 3 having a series of laterally spaced vertically elongated visibility apertures 4 on the two opposite sides thereof, and a base 5, all preferably made of sheet metal.

Within the casing 3 is arranged a slice receiving cage 6 formed by laterally spaced vertically positioned rods 7 arranged in two rows; one row on each side of a center plane through the toaster, and inclosing a space of size adapted to freely receive a slice of bread to be completely housed therein. Between the cage 6 and the wall of the casing 2 are positioned a set of heating element sections 8 which, as here shown, consist of a continuous length of resistance wire arranged in a series of four straight vertically positioned and laterally spaced coils, on each side of the cage 6, located centrally back of the blind portion of the casing 3 between the visibility apertures 4. The wire convolutions constituting these coils are not uniformly spaced but are wound closer together near the lower end of the coil than are those of the upper portion. This arrangement gives a more uniform distribution of heat. Within each coil is inserted a stick 9 of refractory insulating material, preferably composed of mica, which prevents warping of the coil when heated. Mica is particularly suitable for this purpose because it possesses the desired characteristics of being unaffected by heat and is sufficiently stiff and elastic to withstand the shock of a fall without breaking. The coils are preferably mounted on two frames, one on each side of the toaster, which frames consist of the cage rods 7 and the horizontally positioned tubular members 10 to which the ends of the rods 7 are welded or otherwise attached at 11. The ends of the tubular members 10 abut the inner walls of the casing 3 and are held in position by the screws 12. Electric insulators 13 which may be composed of compressed asbestos, are housed within the tubular members 10, and hooks 14 are in turn supported by the insulators 13. The flat heads 15 at the shank ends of the hooks serve to hold the hooks rigidly in the insulators. The heating coils 8 are attached at their ends to the hooks 14 and are thereby held in position. The lead wires 16 of the electric heating system are connected to the insulated terminals 17 and 18 and the two halves of the electric system are connected together by the screw 19.

The heat reflecting guard members 20 having angularly disposed flanges 21 are positioned vertically, parallel and adjacent to the heating coils 8, standing between the coils 8 and the casing wall 3. A small clearance space 22 separates the back of the member 20 from the inner surface of the casing. At their upper and lower ends the members 20 connect to transverse strips 23 and 24 which are fixedly positioned by offset edges 23' and 24' between the casing and the tubular members 10. As here shown the four members 20 on either side of the toaster, with their angularly positioned flanges 24 and the transverse strips 22 and 23, are stamped out as a unit from one sheet of steel and are bright copper plated on their inner surfaces. Obviously, if desired, the members 20 can be made and positioned individually and so made will be equally as efficient as the construction here shown. Each member 20 surrounds about two thirds of its adjacent coil periphery leaving that remaining third exposed which is closest to the center plane of the toaster. The members 20 serve the fourfold purpose of, first, heat reflectors; second, protective guards for the coils 8; third, light guards; fourth, heat guards preventing excessive heating of the toaster casing 3. As heat reflectors, they reflect and diffuse evenly over the surface of the bread being toasted all the outwardly and laterally directed heat rays most of which would otherwise be wasted. The sectional shape of these reflecting members 20 as shown by the drawing is found to give even distribution of the heat but it is apparent that other sectional shapes for the reflecting surfaces will give equally good results but it is obvious that the reflectors should not be of a focussing type which will concentrate the heat rays and cause the bread to be toasted unevenly in vertical strips. Loss of heat from the members 20 due to conduction outwardly through the casing 3 is reduced to a minimum by the nonconducting air space 22. These features of this device render it highly efficient and rapid in operation notwithstanding the large aperture area on both sides of the toaster. As protective guards, the members 20 serve the essential purpose of effectively protecting the heating elements 8 against accidental damage. This feature is especially important where the visibility apertures are large and where no protective glass windows are employed. As light guards, the members 20 render the heating elements wholly invisible during the toasting operation, which feature, as already pointed out, is desirable to eliminate disagreeable glare from the hot and brightly luminous elements, thereby improving visibility and making possible better determination of the proper time to remove the toast. As heat guards, as has already been pointed out, the members 20 prevent excessive loss of heat through conduction and resultant excessive heating of the casing 3, due to the separating air space 22. Obviously some heat will be conducted longitudinally through the members 20 and thereby reach the casing 3 but such loss is comparatively small due to the small sectional area of the member 20.

Fig. 4 illustrates a modified construction of the casing shell 3 and the reflecting members 20 and flanges 21. It is a perspective view of one half of the shell only, looking toward the inside. This view shows plainly that in this modified form the members 20 with their flanges 21 are integral parts of the casing 3, all being formed from one sheet of metal. This construction will not be as efficient or rapid in the toasting operation as the form shown in Figs. 1, 2, and 3 but it will cost less to manufacture and is therefore well adapted to low priced toasters.

Within the cage 6 is a horizontal toast supporting and lifting member 25 normally positioned at a level about alined with the lower ends of the heating elements 8. As here shown, the member 25 is formed of a flat strip carried at one end by the vertically guided slide bar 26. The slide bar 26 is provided with T shaped prongs 27 and 28 projecting outwardly from its upper and lower ends respectively. These prongs 27 and 28 project through and slide freely in a vertical slot 29 in the toaster casing 3 and serve to guide the slide bar 26 while retaining it in a vertical position. The ejector handle 30 is carried by the slide bar 26, its shank projecting through the slot 29. The vertical slot 29 is centrally located at one end of the casing 3 and extends from the point 31 to the top of the casing. The vertical travel of the lifting member 26 equals the distance from the top of the prong 27 to the bottom of the plate 1. This travel is sufficient to raise the upper portion of the toast above the toaster top permitting its removal therefrom by hand.

The top plate 1, the casing 3 and the case 5 are firmly held together by the elongated, vertically positioned, rods 32 which are headed at their upper ends and threaded at their lower ends. They are located adjacent to each corner of the casing 3 and pass down from the top plate 1 through the base 5 where they screw into the feet members 33. The feet members 33 serve the twofold purpose of feet for the toaster to stand on and nuts for the rods 32. They are preferably made of fibre or any suitable heat insulating material.

While the heating elements 20 herein shown and described are of the straight coil type this invention is not limited to this particular type of heating element for it is obvious that this device will operate as well with other types and forms of heating elements.

The operation of the toaster is simple and obvious. The slice of bread to be toasted is dropped into the opening 2 and when the desired degree of toasting has been effected, which is easily observed, the handle 30 is raised with one hand while the toast is removed with the other hand.

While I have illustrated and described with particularity only a single use or application and a preferred form of my invention, I do not desire to be limited to such use or the exact structural details thus illustrated and described; but intend to cover all forms and arrangements which come within the definitions of my invention constituting the appended claims.

What I claim as my invention and desire to secure by Letters Patent is:

1. A device of the class described comprising, a casing, means for positioning food material therein, heating element sections separately spaced therein, a plurality of visibility apertures in the casing wall positioned opposite the spaces between the heating element sections and guard members having non-focusing heat reflecting inner surfaces partially surrounding each heating element section, said guard members being positioned within the casing wall and spaced therefrom and outwardly opposite to each heating element section.

2. A device of the class described comprising, a casing, means for positioning food material therein, a plurality of elongated heating element sections separately spaced and positioned in parallel alignment therein, a plurality of visibility apertures in the casing wall positioned alternately in reference to the heating element sections and opposite the spaces between the said heating element sections, and elongated guard members positioned within the casing wall and spaced therefrom, having non-focusing heat reflecting surfaces partially surrounding the heating element sections and outwardly opposite thereto.

3. A device of the class described comprising, a casing, means for positioning food material therein, a heating element consisting of a plurality of elongated helical coils separately spaced and positioned in parallel alignment therein, refractory stiffening rods positioned within the coils, a plurality of elongated visibility apertures in the casing wall positioned alternately in reference to the heating element coils and opposite to the spaces between said coils and elongated guard members positioned within the casing wall and spaced therefrom, having non-focusing heat reflecting surfaces partially surrounding the heating element sections and outwardly opposite thereto.

EDWARD S. SAVAGE.